United States Patent
Goggin et al.

(10) Patent No.: US 7,974,945 B2
(45) Date of Patent: Jul. 5, 2011

(54) SYSTEM AND METHOD FOR SYNCHRONIZING A BLACKBERRY WITH A MACINTOSH

(75) Inventors: Terence Goggin, Pacific Grove, CA (US); Russ Winsper, Rancho Mirage, CA (US)

(73) Assignee: Information Appliance Associates, San Diego, CA (US)

( * ) Notice: Subject to any disclaimer, the term of this patent is extended or adjusted under 35 U.S.C. 154(b) by 360 days.

(21) Appl. No.: 11/163,751

(22) Filed: Oct. 28, 2005

(65) Prior Publication Data

US 2007/0005663 A1 Jan. 4, 2007

Related U.S. Application Data

(60) Provisional application No. 60/691,455, filed on Jun. 16, 2005.

(51) Int. Cl.
*G06F 7/00* (2006.01)
*G06F 17/00* (2006.01)
(52) U.S. Cl. .................... 707/621; 707/625
(58) Field of Classification Search .......... 717/16, 717/17; 707/621
See application file for complete search history.

(56) References Cited

U.S. PATENT DOCUMENTS

| | | | | |
|---|---|---|---|---|
| 6,209,124 B1* | 3/2001 | Vermeire et al. | | 717/114 |
| 6,295,541 B1* | 9/2001 | Bodnar et al. | | 707/203 |
| 6,757,696 B2* | 6/2004 | Multer et al. | | 707/201 |
| 6,862,617 B1 | 3/2005 | Wu | | |
| 7,080,159 B2* | 7/2006 | Chu et al. | | 709/246 |
| 2002/0065939 A1* | 5/2002 | Liu | | 709/248 |
| 2002/0169000 A1* | 11/2002 | King | | 455/556 |
| 2003/0135663 A1* | 7/2003 | Duncan et al. | | 709/321 |
| 2003/0212826 A1* | 11/2003 | Rapakko et al. | | 709/246 |
| 2005/0050084 A1* | 3/2005 | Atm | | 707/102 |

FOREIGN PATENT DOCUMENTS

EP 1 271 360 A 1/2003

OTHER PUBLICATIONS http://web.archive.org/web/20041118011116/www.pocketmac.net/products/pmblackberry/index.html.*
http://web.archive.org/web/20041015044807/www.pocketmac.net/customersupport/ppcinstaller.html.*
http://web.archive.org/web/20040605035946/www.pocketmac.net/products/pmpro3/devices.html, PocketMac, Jun. 11, 2004.*
Sascha Segan, "Pocketmac for Blackberry" PCMAG.COM Feb. 28, 2005, Retrieved from Internet http://www.pcmag.com/article2/9,1759,1721110,00.asp (retrieved on Nov. 11, 2007).
Goggin, Terence, et al. "PocketMac BlackBerry 3.0 Installation & Setup", 2004.

* cited by examiner

*Primary Examiner* — John R. Cottingham
*Assistant Examiner* — Nicholas E Allen
(74) *Attorney, Agent, or Firm* — Saul Ewing LLP

(57) ABSTRACT

A system and method enable a BlackBerry device to communicate with and be synchronized with a Macintosh computer.

22 Claims, 4 Drawing Sheets

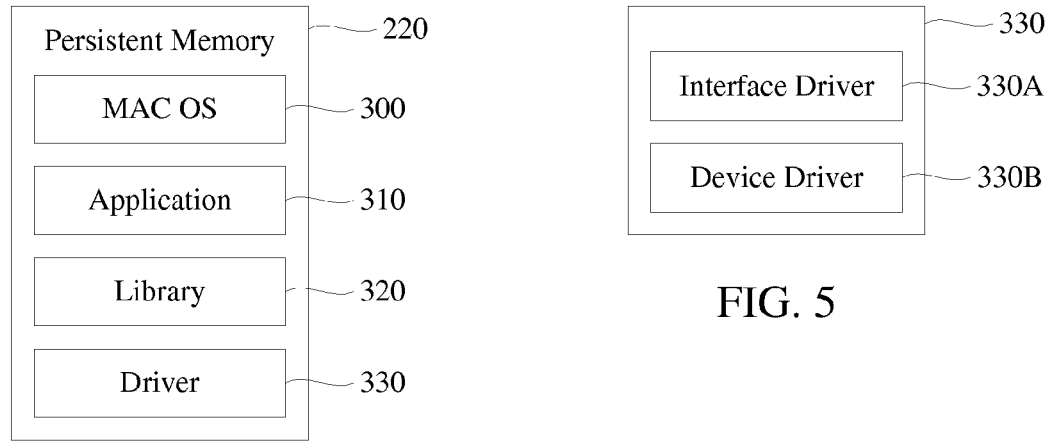
FIG. 3
FIG. 5
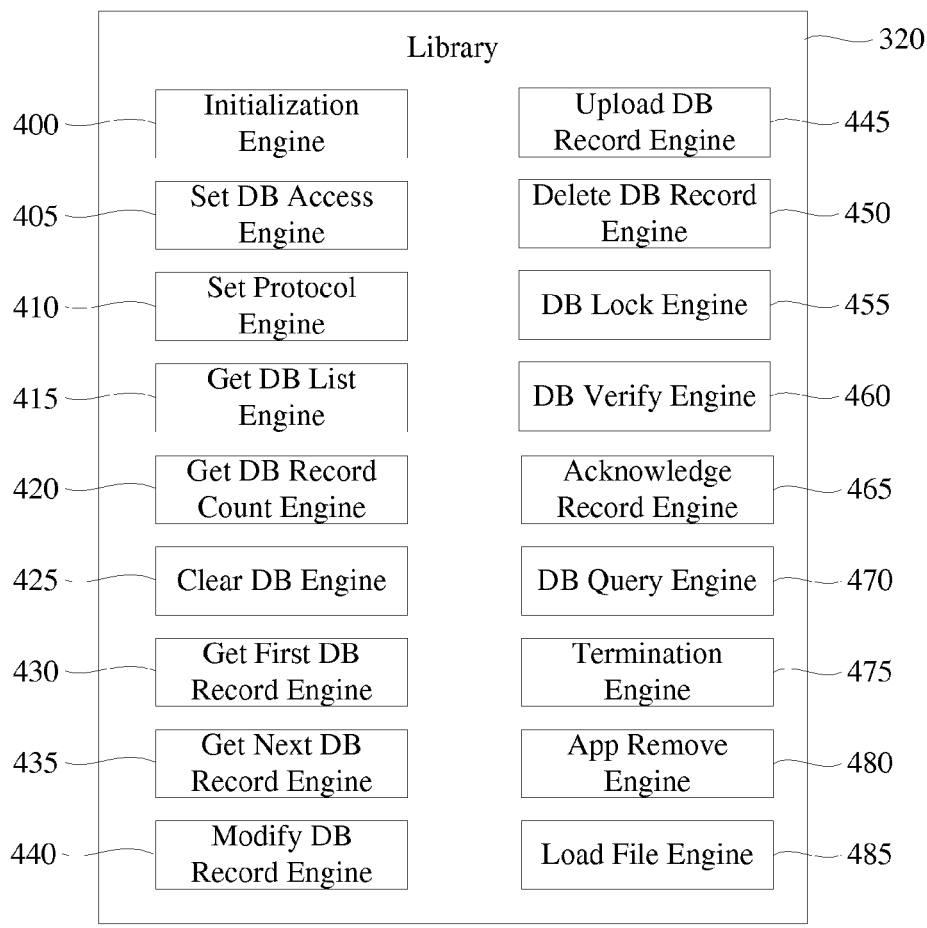
FIG. 4

600

| Command | Database ID | Version | Record Handle | Data Length | Field ID | Data |
|---|---|---|---|---|---|---|
| 44 | 12 00 | 55 | 98 00 | 09 00 | 03 | 4C 6F 76 65 6C 69 65 72 00 |
|  | 12 |  | 664 | 9 bytes |  | Lovlier |

```
<?xml version="1.0" encoding="UTF-16" ?>
<pi>
   <contact oid="134221302" fileas="Brown, Ty" firstname="Ty" middlename="" lastname="Brown"
      suffix="" companyname="Ty Brown & Associates" email1="tybrown@brown.net"
      work_phone1="(909) 374-4558" mobile_phone="(909) 292-6645" job_title="President"
      anniversary="" birthday="" work_street="2098 Indianapolis Ave." work_city="Irvine"
      work_state="CA" work_postal="92652" work_country="United States of America" />
</pi>
```

FIG. 7

SYSTEM AND METHOD FOR SYNCHRONIZING A BLACKBERRY WITH A MACINTOSH

PRIORITY REFERENCE TO PRIOR APPLICATIONS

This application claims benefit of and incorporates by reference patent application Ser. No. 60/691,455, entitled "POCKETMAC FOR BLACKBERRY," filed on Jun. 16, 2005, by inventors Terence GOGGIN et al.

TECHNICAL FIELD

This invention relates generally to synchronization of data between electronic devices, and more particularly, but not exclusively, provides a system and method for synchronizing data from a Macintosh computer with a BlackBerry device.

BACKGROUND

File synchronization (hereinafter synchronization) refers to the synchronization of data between two devices. Users want to synchronize data between devices so that they can access the same data on either device. For example, a user may use a desktop computer at home and a Personal Digital Assistant, such as a BlackBerry, outside the home but will want to access the same data on both devices. In order to access the same data, a BlackBerry, which is a wireless handheld device that provides email, telephone, text messaging and web browsing, is synchronized with a computer running a Windows operating system (OS) through a software package, such as BlackBerry Desktop Software or BlackBerry Enterprise Server. For example, data files, such as appointments, contacts, tasks, notes, etc., can be synchronized between a BlackBerry and a Windows Personal Computer (PC) such that the files are identical on both.

However, no such synchronization software is available to Macintosh computer users. Accordingly, Macintosh computer users cannot automatically synchronize their computer with their BlackBerry. Instead, they must 1) manually compare and enter data in both devices; 2) transmit data from a Macintosh computer to a Windows PC and then synchronize the Windows PC to the BlackBerry, which would be only a one-time solution; and/or 3) use SynchAgain software, which requires the use of a Windows PC for installation of the software, the use of Macintosh computer perpetually connected to the Internet and therefore possibly open to attacks. All of the above methods are time consuming and the last two methods require the purchase of a Windows PC, perhaps only for the purpose of synchronization, which is an expensive purchase for a single purpose.

Accordingly, a new system and method are needed that enables the automatic synchronization of a Macintosh computer with a BlackBerry device without the purchase of a Windows PC.

SUMMARY

The system and method enable a BlackBerry device to be synchronized with a Macintosh computer. In an embodiment of the invention, the system comprises a device driver, an interface driver, a library, and an application. The device drive is capable of adding a configuration zero ok to a register. The interface driver is capable of interfacing with the BlackBerry device. The library is capable of receiving data from the BlackBerry device. The application, which is communicatively coupled to the library, is capable of synchronizing the received data with data from the Macintosh computer.

In an embodiment of the invention, the method comprises: adding a configuration zero ok to a register; interfacing with the BlackBerry device; receiving data from the BlackBerry device; and synchronizing the received data with data from the Macintosh computer.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 is a block diagram illustrating a persistent memory of the Macintosh computer;

FIG. 4 is a block diagram illustrating a library of the memory;

FIG. 5 is a block diagram illustrating the driver of the memory;

FIG. 6 is a table illustrating parsed data received from the BlackBerry;

FIG. 7 is a diagram illustrating XML coded data; and

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
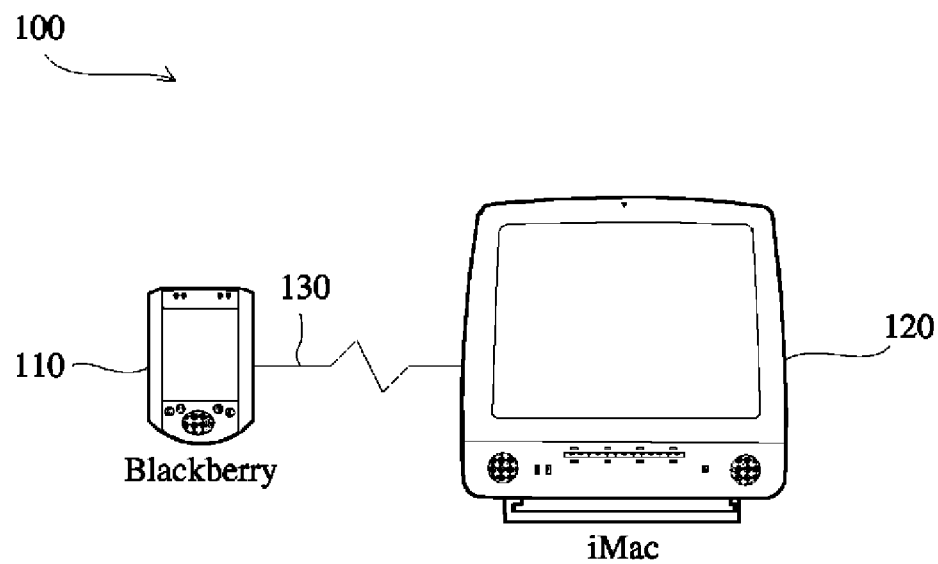
FIG. 1 is a diagram illustrating a network system comprising a BlackBerry device communicatively coupled to a Macintosh computer.

FIG. 1 is a diagram illustrating a network system 100 comprising a BlackBerry device 110 communicatively coupled to a Macintosh computer 120, such as an iMac, via a wired or wireless connection 130, such as USB or serial wired connections. Wireless connections can be local (e.g., short range) such as Wi-Fi, Ultra WideBand (UWB) or Bluetooth, or long range, such as WiMax. In an embodiment of the invention, the Macintosh computer 120 can be communicatively coupled to a network of Macintosh computers.

During operation of the network 100, the BlackBerry device 110 and the Macintosh computer 120 exchange data to perform synchronization to ensure that data on both match. As will be described in further detail below, the BlackBerry device 110 send a dataset to the Macintosh computer 120, which compares it to a dataset stored therein and then synchronizes the BlackBerry dataset and the Macintosh dataset, ensuring that the two datasets are identical. For example, if an entry was deleted from the BlackBerry 110 dataset, then synchronization would cause the deletion of the entry from the Macintosh dataset. If an entry was modified in the Macintosh dataset, that entry would be modified accordingly in the BlackBerry dataset. Data than can be synchronized between the Macintosh computer 120 and the BlackBerry 110 include email, contacts, customer relation management data, files, software (e.g., executable files), etc.

Figure 2:
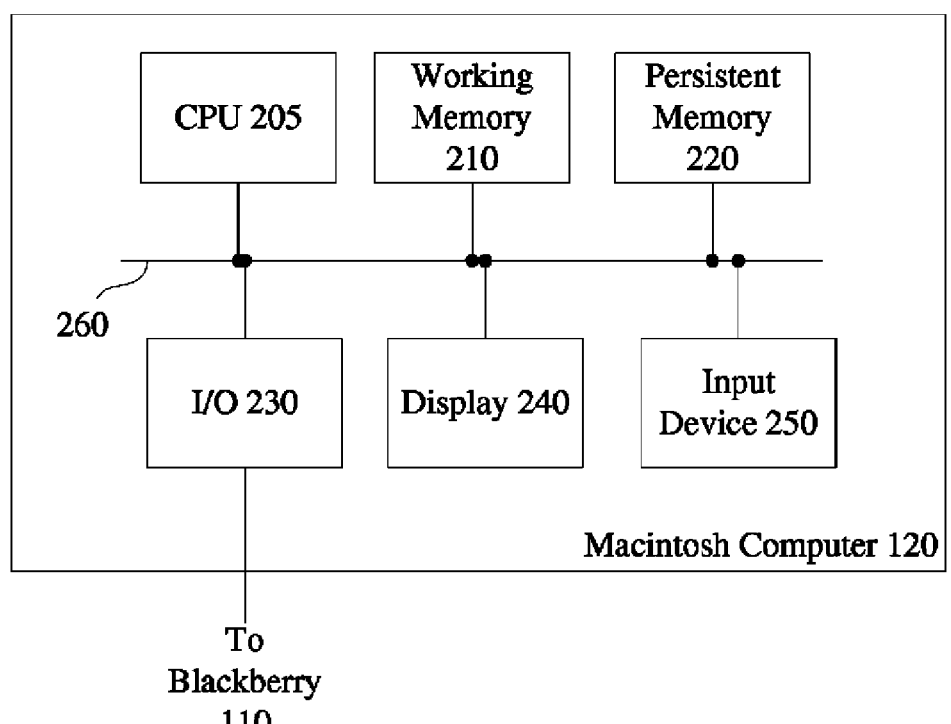
FIG. 2 is a block diagram illustrating the Macintosh computer of FIG. 1.

FIG. 2 is a block diagram illustrating the Macintosh computer 120. The computer 120 includes a central processing unit (CPU) 205; working memory 210; persistent memory 220; input/output (I/O) interface 230; display 240; and input device 250, all communicatively coupled to each other via a bus 260. The CPU 205 may include a Motorola POWERPC microprocessor, or any other processor capable to execute software stored in the persistent memory 220. The working memory 210 may include random access memory (RAM) or any other type of read/write memory devices or combination of memory devices. The persistent memory 220 may include a hard drive, read only memory (ROM) or any other type of memory device or combination of memory devices that can retain data after the computer 120 is shut off. The I/O interface 230 is communicatively coupled, via wired or wireless techniques, to the BlackBerry 110. The display 240 may include a flat panel display, cathode ray tube display, or any other display device. The input device 250, which is optional like other components of the invention, may include a keyboard, mouse, or other device for inputting data, or a combination of devices for inputting data.

One skilled in the art will recognize that the computer 120 may also include additional devices, such as network connections, additional memory, additional processors, LANs, input/output lines for transferring information across a hardware channel, the Internet or an intranet, etc. One skilled in the art will also recognize that the programs and data may be received by and stored in the system in alternative ways.

FIG. 3 is a block diagram illustrating the persistent memory 220 of the Macintosh computer 120. The persistent memory 220 includes a Macintosh Operating System (Mac OS) 300, one or more applications 310, a library 320 and a driver 330. The Mac OS 300 can include any version of Mac OS including Mac OS X. The application 310, which is what users see, manipulates data coming from the BlackBerry 110, performs synchronization, prompts the user for additional input, and so on. In an embodiment of the invention, the application 310 includes Microsoft Entourage X; Microsoft Entourage 2004/11; Now Contact; Now Up-to-Date; Stickies; DayLite 1.7; Apple OS X Address Book; and Apple iCal. In another embodiment of the invention, the application 310 in addition includes Lotus Notes and MeetingMaker and other applications.

In an embodiment of the invention, the application 310 can also synchronize multiple BlackBerries 110 with a Macintosh computer 120 having different users. For example, the application 310 can check user information of the BlackBerry 110, determine the user's files on the Macintosh computer 120 and then synchronize only the user's files (as compared to other users' files on the Macintosh computer 120). In another embodiment of the invention, the application 310 backs up files stored on the BlackBerry 110 onto the Macintosh computer 120 by requesting the files from the BlackBerry 110, receiving the files from the BlackBerry 110, and storing the files in the persistent memory 220.

In another embodiment, the application 310 synchronizes data from the BlackBerry 110 to one or more Macintosh computers networked to the Macintosh computer 120. For example, changes to contacts in the BlackBerry 110 can be transmitted to all Macintosh computers in a network, which are then synchronized with contacts stored on the respective computers such that the Macintosh computers include contacts identical with the BlackBerry 110.

The library 320, as will be discussed in further detail in conjunction with FIG. 4, includes common functions that abstract some of the communication protocol elements in a way that allows the application 310 to more easily communicate with the BlackBerry 110, i.e., the library 320 is a collection of routines to help the application 310 communicate with, parse data from, and generally manage communicating with the BlackBerry 110. The library 320 also provides a layer of abstraction between the code of the application 310 that calls into the library 320 and the code that comprises the library 320. That is, the underlying details of how the library 320 work and what it does may change, but individual routines that are available to the application 310 do not change.

The driver 330, as will be discussed in more detail in conjunction with FIG. 5 below, is responsible for making the BlackBerry 110 available to the Macintosh computer 120 in a form that enables other software, e.g., the application 310, to interact with it, charge its battery, etc. Specifically, the driver 330 takes the interface presented by the BlackBerry 110 appear as a serial port to the Mac OS 300.

FIG. 4 is a block diagram illustrating the library 320. The library 320 includes an initialization engine 400, a set database (DB) access engine 405, a set protocol engine 410, a get DB list engine 415, a get DB record count engine 420, a clear DB engine 425, a get first DB record engine 430, a get next DB record engine 435, a modify DB record engine 440, an upload DB record engine 445, a delete DB record engine 450, a DB lock engine 455, a DB verify engine 460, an acknowledge record engine 465, a DB query engine 470, a termination engine 475, an App remove engine 480 and a load file engine 485.

The initialization engine 400 gets basic information needed for synchronization, such as, the unique ID of the BlackBerry device so that individual handhelds can be differentiated. The set DB access engine 405 sets access to databases on the BlackBerry 110 so that they can be read and written to. The set protocol engine 410 sets desktop protocols (what is seen on a user's desktop) and other protocols, such as modem protocol, which tells the BlackBerry what sort of operation it'll be used for, such as exchanging data, installing software, or behave as a modem. The get DB list engine 415 gets a list of DBs on the BlackBerry 110. The get DB record count engine 420 gets a count of the number of records in a selected DB. The clear DB engine 425, which can be disabled, erases a DB. The get first DB record engine 430 gets the first DB record in a DB. The get next DB record engine 435 gets the next DB record. The modify DB record engine 440 modifies a record. The upload DB record engine 445 uploads a new record to the BlackBerry 110. The delete DB record engine 450 deletes a DB record. The DB locks engine 455 locks a DB so that it cannot be deleted or modified. The DB verify engine 460 ensures the integrity of the data updated/written to the BlackBerry. The acknowledge record engine 465 provides a "commit sync" point for the BlackBerry to let it know a group of operations is complete. The DB query engine 470 searches a DB for records matching criteria specified in a query. The termination engine 475 terminates a connection with the BlackBerry 110. The app remove engine 480 deletes applications stored on the BlackBerry 110. The load file engine 485 loads files into the BlackBerry 110. In an embodiment of the invention, the library 320 includes additional engines.

FIG. 5 is a block diagram illustrating the driver 330. The driver 330 includes an interface driver 330A and a device driver 330B. The drivers 330A and 330B are specific pieces of software that enable communication between the BlackBerry 110 and the Macintosh computer 120. The drivers 330A and 330B translates generic commands from applications on the Macintosh computer 120 into commands that the BlackBerry 110 can understand. Specifically, the drivers 330A and 330B take the interface presented by the BlackBerry 110 when it's connected to the Macintosh computer 120 via a USB cable or other connection 130, and makes the BlackBerry 110 appear as a serial port to the rest of the Mac operating system 300.

One of the versions of the software that lives on the BlackBerry was basically "illegal" according to the USB spec. That is, v3.7.1.21 (Platform 1.6.1.23) of the BlackBerry operating system contained a bug that caused it to publish a bad "descriptor."

The descriptors, in a USB device, specify the way the device operates and are split into multiple sections. One descriptor defines the device itself, another the device configuration, followed by the interface descriptors and finally the pipe descriptors.

In the Blackberry device the configuration descriptor value is set to zero which is an illegal value, according to the USB Implementers' Forum documentation. The Apple IOUSB-Family provides a way to circumvent this problem by adding a "Configuration Zero OK" property to the IORegistry. However this only works for an interface driver, not a device driver.

While Windows computers are less stringent with USB devices and specs, Apple is not. As such, the driver comprises two components: The Blackberry device driver 330B, which initially loads, and adds the "Configuration Zero OK" property to the IORegistry, and then instantiates the interfaces and starts the loading process for the interface driver 330A. The IOUSBFamily will allow the essentially illegal Blackberry interface driver 330A to load because of the property that was added to the IORegistry.

FIG. 6 is a table illustrating parsed data 600 received from the BlackBerry 110. The get first DB record engine 430 and the get next DB engine 435 retrieves DB records, parses the retrieved DB records, and converts them to XML. An example of parsed data 600 is shown in FIG. 6 in hexadecimal. When the Macintosh computer 120 retrieves a DB record, the DB record is purely a string of numbers. The engines 430 and 435 parse the data into chunks that can be easily converted into XML. The parsed data 600 can be parsed into the following fields: Command, Database ID, Version, Record Handle, Data Length, Field ID, and Data. The Command field is a numeric identifier for the operation (command) we issue to the device. That is, each value corresponds to a specific action. The command shown in FIG. 6 (0x44) is the "download record command", or a request from our software to the BlackBerry for a record from the database currently opened. The Database ID field, then, is used to identify the database from which we're requesting data. The Version field identifies the version of the database. It seems this has something to do with how long (historically speaking) the BlackBerry devices have offered a particular database. The Record Handle field uniquely identifies the record being sent by the BlackBerry within the database, so that it can be referenced more efficiently in any future operations performed upon it (deletion, modification, etc.). The Data Length field tells us how many bytes worth of data are contained in the record. The Field ID uniquely identifies one column of data (or field) of the record within the database. The Data field is the actual data of a particular field or column within the record. There can be multiple Field ID/Data pairs in a given record.

FIG. 7 is a diagram illustrating XML coded data 700. Once parsed, the data 600 is converted to XML coded data, such as the data 700 shown in FIG. 7. In this way, the data is both easily machine- or software-readable, yet at the same time, easily human-readable.

The data in XML format is compared against XML-formatted representations of the Macintosh data, and then discarded. The changes to be applied to the BlackBerry are then stored as an XML document which can then be easily processed by the rest of the system, such as by the modify DB record engine 440 or the upload DB record engine 445.

Figure 8:
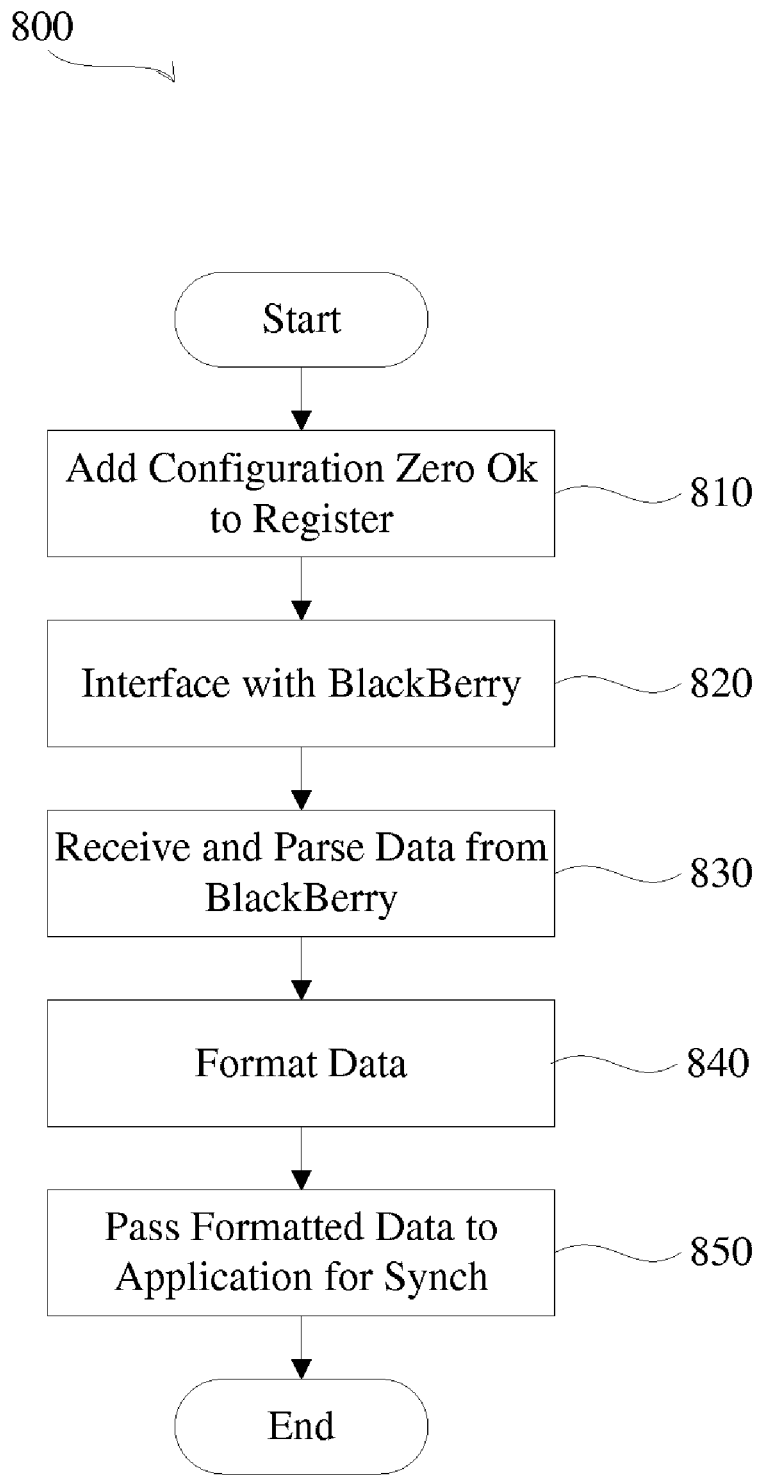
FIG. 8 is a flowchart illustrating the synchronization of data between the Macintosh computer and the BlackBerry.

FIG. 8 is a flowchart illustrating a method 800 of synchronization of data between the Macintosh computer 120 and the BlackBerry 110. In an embodiment of the invention, the library 320 and the driver 330 execute the method 800. Further, multiple instances of the method can be instantiated substantially simultaneously to enable synchronization of one or more Macintosh computers 120 with one or more BlackBerries 110. After communicatively coupling one or more of the Macintosh computer 120 to one or more of the BlackBerry 110, a configuration Zero Ok is added (810) to the IORegistry. The Macintosh computer 120 is then interfaced (820) with the BlackBerry 110. Data is then received and parsed (830) from the BlackBerry. The received parsed data is then formatted (840) into XML and passed (850) to an application for synchronization, which includes comparing the received formatted with data stored on the Macintosh computer 120; generating data indicating the differences and then forwarding it to the BlackBerry 110 to update the BlackBerry data. Further, the synchronization can occur on multiple Macintosh computers 120 or on multiple BlackBerries 110.

The foregoing description of the illustrated embodiments of the present invention is by way of example only, and other variations and modifications of the above-described embodiments and methods are possible in light of the foregoing teaching. Although the engines are being described as separate and distinct, one skilled in the art will recognize that these engines may be a part of an integral site, may each include portions of multiple engines, or may include combinations of single and multiple engines. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A computer-implemented method for synchronizing data between a handheld electronic device and a computer communicatively coupled thereto, the handheld device comprising a first memory and a database stored in the first memory, the computer comprising a bus communicatively coupling a second memory, an XML-formatted dataset stored in the second memory, a processor for executing software stored in the second memory, and a software application stored in the second memory, the processor executing the software application to perform the following steps:
  retrieve, at the computer, database records stored in the database of the handheld device;
  parse, at the computer, retrieved database records into fields of data;
  convert, at the computer, the parsed fields of data to XML-coded data;
  compare, at the computer, the XML-coded data to XML-formatted data from the computer's stored dataset;
  generate, at the computer, data indicating differences between the XML-coded data from the handheld device and the XML-formatted data from the computer; and
  synchronize data on the handheld device and on the computer.

2. The method of claim 1, wherein synchronizing data on the handheld device and on the computer comprises:
forwarding the generated data to the handheld device; and
updating the data on the handheld device to reflect the indicated differences.

3. The method of claim 1, wherein synchronizing data on the handheld device and the computer comprises:
deletion of an entry from the computer in response to a corresponding deletion of an entry from the handheld device.

4. The method of claim 1, wherein synchronizing data on the handheld device and the computer comprises:
modifying an entry on the handheld device in response to a corresponding modification of an entry on the computer.

5. The method of claim 1, wherein synchronizing data on the handheld device and the computer comprises:
modifying an entry on the computer in response to a corresponding modification of an entry on the handheld device.

6. The method of claim 1, wherein the computer further comprises an input/output interface, a display, and an input device communicatively coupled with the memory and the processor by the bus.

7. The method of claim 6, wherein the handheld electronic device and the computer are communicatively coupled by a wired connection.

8. The method of claim 7, wherein the wired connection is selected from the group consisting of a USB connection and a serial connection.

9. The method of claim 6, wherein the handheld electronic device and the computer are communicatively coupled by a wireless connection.

10. The method of claim 9, wherein the wireless connection is selected from the group consisting of a Wi-Fi connection, an Ultra WideBand connection, a Bluetooth connection, and a WiMax connection.

11. The method of claim 6, wherein the second memory includes:
an operating system;
driver software enabling communication between the handheld device and the computer by translating generic commands from applications on the computer to understandable commands for the handheld device; and
a library.

12. The method of claim 11, wherein the driver software manages the interface presented by the handheld device, when it's connected to the computer via a USB cable or other connection, and causes the handheld device to appear as a serial port to the computer.

13. The method of claim 11, wherein the library comprises:
an initialization engine configured to get information needed for synchronization;
a set database (DB) access engine configured to set access to databases on the handheld device so that they are readable and writable;
a set protocol engine configured to set protocols for handheld device operation;
a get DB list engine configured to get a list of databases on the handheld device;
a get DB record count engine configured to get a count of the number of records in a selected database;
a clear DB engine configured to selectively erase a database;
a get first DB record engine configured to get the first database record in a database;
a get next DB record engine configured to get a next database record in a database;
a modify DB record engine configured to modify a database record;
an upload DB record engine configured to uploads a new record to the handheld device;
a delete DB record engine configured to delete a database record;
a DB lock engine configured to lock a database so that it cannot be deleted or modified;
a DB verify engine configured to ensure the integrity of data updated/written to the handheld device;
an acknowledge record engine configured to provide a "commit sync" point for the handheld device to let it know a group of operations has been completed;
a DB query engine configured to search a database for records matching criteria specified in a query;
a termination engine configured to terminate a connection with the handheld device;
an App remove engine configured to delete applications stored on the handheld device; and
a load file engine configured to load files into the handheld device.

14. A method for synchronizing data between a handheld electronic device and a computer communicatively coupled thereto, the handheld device comprising a first memory and a database stored in the first memory, the method comprising:
providing a computer comprising:
a second memory, the second memory storing:
an XML-formatted dataset;
a software application configured to perform data synchronization;
an operating system stored in the second memory;
driver software, stored in the second memory, that enables communication between the handheld device and the computer by translating generic commands from applications on the computer to understandable commands for the handheld device; and
a library of routines;
a processor for executing software stored in the second memory; and
a bus communicatively coupling the second memory, the processor; and
operating the processor to execute the software application and cause the computer to:
retrieve from the handheld device, database records stored in the database of the handheld device;
parse, at the computer, retrieved database records into fields of data;
compare, at the computer, the parsed data to data from the computer's stored dataset;
generate, at the computer, data indicating differences between the parsed data from the handheld device and the data from the computer; and
synchronize data on the handheld device and on the computer.

15. The method of claim 14, wherein the dataset stored in the second memory is XML-formatted, the method further comprising the processor executing the software application to cause the computer to perform the following step:
convert the parsed fields of data to XML-coded data.

16. The method of claim 14, wherein the library of routines comprises:
an initialization engine configured to get information needed for synchronization;
a set database (DB) access engine configured to set access to databases on the handheld device so that they can be read and written to;

a set protocol engine configured to set protocols for handheld device operation;
a get DB list engine configured to get a list of databases on the handheld device;
a get DB record count engine configured to get a count of the number of records in a selected database;
a clear DB engine configured to selectively erase a database;
a get first DB record engine configured to get the first database record in a database;
a get next DB record engine configured to get a next database record in a database;
a modify DB record engine configured to modify a database record;
an upload DB record engine configured to uploads a new record to the handheld device;
a delete DB record engine configured to delete a database record;
a DB lock engine configured to lock a database so that it cannot be deleted or modified;
a DB verify engine configured to ensure the integrity of data updated/written to the handheld device;
an acknowledge record engine configured to provide a "commit sync" point for the handheld device to let it know a group of operations has been completed;
a DB query engine configured to search a database for records matching criteria specified in a query;
a termination engine configured to terminate a connection with the handheld device;
an App remove engine configured to delete applications stored on the handheld device; and
a load file engine configured to load files into the handheld device;
wherein operating the processor to execute the software application involves interaction of the driver and the library of routines.

17. A system for synchronizing data between a handheld electronic device and a computer communicatively coupled thereto, the system comprising:
a memory, the memory storing:
an XML-formatted dataset;
an operating system stored in the memory;
a processor for executing software stored in the memory;
a bus communicatively coupling the memory, the processor; and
instructions for performing data synchronization by:
retrieving, at the computer, database records stored in a database of the handheld device;
parsing, at the computer, retrieved database records into fields of data;
converting, at the computer, the parsed fields of data XML-coded data;
comparing, at the computer, the XML-coded data to XML-formatted data from the computer's stored dataset;
generating, at the computer, data indicating differences between the XML-coded data from the handheld device and the XML-formatted data from the computer; and
synchronizing data on the handheld device and on the computer.

18. The system of claim 17, further comprising:
driver software, stored in the memory, that enables communication between a handheld device and the computer by translating generic commands from applications on the computer to understandable commands for the handheld device; and
a library of routines stored in the memory;
wherein the computer performs data synchronization by interfacing with the driver software and the library of routines.

19. The system of claim 18, wherein the library of routines comprises:
an initialization engine configured to get information needed for synchronization;
a set database (DB) access engine configured to set access to databases on the handheld device so that they can be read and written to;
a set protocol engine configured to set protocols for handheld device operation;
a get DB list engine configured to get a list of databases on the handheld device;
a get DB record count engine configured to get a count of the number of records in a selected database;
a clear DB engine configured to selectively erase a database;
a get first DB record engine configured to get the first database record in a database;
a get next DB record engine configured to get a next database record in a database;
a modify DB record engine configured to modify a database record; and
an upload DB record engine configured to uploads a new record to the handheld device;
a delete DB record engine configured to delete a database record;
a DB lock engine configured to lock a database so that it cannot be deleted or modified;
a DB verify engine configured to ensure the integrity of data updated/written to the handheld device;
an acknowledge record engine configured to provide a "commit sync" point for the handheld device to let it know a group of operations has been completed;
a DB query engine configured to search a database for records matching criteria specified in a query;
a termination engine configured to terminate a connection with the handheld device;
an App remove engine configured to delete applications stored on the handheld device; and
a load file engine configured to load files into the handheld device; and
wherein operating the processor to execute the software application involves interaction of the driver and the library of routines.

20. The system of claim 17, further comprising:
the handheld device communicatively coupled to the computer, the handheld device comprising a memory and a database stored in the memory.

21. A computer-implemented method for updating data between a handheld electronic device and a computer communicatively coupled thereto, the handheld device comprising a first memory and records stored in the first memory, the computer comprising a bus, a second memory, a dataset stored in the second memory, a processor for executing software stored in the second memory, and a software application stored in the second memory, the processor executing the software application to perform the following steps:
receive, at the computer, a copy of the data records stored in the memory of the handheld device;
parse, at the computer, received data records into fields of data to be updated;
compare, at the computer, the parsed data to data from the computer's stored dataset; and update data on at least one of the handheld device and the computer as a function of differences between the parsed handheld device data and the computer data.

22. The method of claim 21, wherein the dataset stored in the memory is XML-formatted, the method further comprising the processor executing the software application to cause the computer to perform the following step:
convert the parsed fields of data to XML-coded data.

* * * * *